US006397785B1

(12) United States Patent
Fierle

(10) Patent No.: US 6,397,785 B1
(45) Date of Patent: Jun. 4, 2002

(54) ROTOR DESIGN WITH DOUBLE SEALS FOR HORIZONTAL AIR PREHEATERS

(75) Inventor: Kurt M. Fierle, Wellsville, NY (US)

(73) Assignee: ABB Alstom Power N.V., Amsterdam (NL)

( * ) Notice: Subject to any disclaimer, the term of this patent is extended or adjusted under 35 U.S.C. 154(b) by 0 days.

(21) Appl. No.: 09/565,964

(22) Filed: May 5, 2000

(51) Int. Cl.$^7$ ................................................. F23L 15/02
(52) U.S. Cl. ................................ 122/1 A; 122/DIG. 2; 165/8; 165/9
(58) Field of Search ........................ 122/1 A, DIG. 2; 165/8, 9, 10; 277/361, 364

(56) References Cited

U.S. PATENT DOCUMENTS

| | | | | |
|---|---|---|---|---|
| 5,836,378 A | * | 11/1998 | Brophy et al. ................. | 165/9 |
| 5,915,339 A | * | 6/1999 | Cox et al. ..................... | 122/1 A |
| 5,915,340 A | * | 6/1999 | Cronin et al. ................. | 122/1 A |
| 6,155,209 A | * | 12/2000 | Finnemore ................... | 122/1 A |

* cited by examiner

Primary Examiner—Gregory Wilson
(74) Attorney, Agent, or Firm—Alix, Yale & Ristas, LLP

(57) ABSTRACT

A method for adding additional axial seals and radial seals within existing air preheaters. The installed heat transfer baskets, radial seals, axial seals, gratings, and stay plates are all removed from the air preheater. An intermediate diaphragm plate is positioned in each original compartment, mounted to the rotor shell and a diaphragm inner support plate. Hot and cold end plates mounted to the post and an inboard portion of the diaphragm plates forming the original compartment provide additional support. New gratings and/or stay plates are installed. Additional hot and cold end axial seal support bars are mounted to the rotor shell and intermediate diaphragm plate. Axial seals are installed on the original and additional axial seal support bars and radial seals are installed on the axial edges of the original and intermediate diaphragm plates. Finally, new heat transfer baskets are inserted into each of the compartments formed by the original diaphragm plates, the intermediate diaphragm plates, and the rotor shell.

10 Claims, 10 Drawing Sheets

ROTOR DESIGN WITH DOUBLE SEALS FOR HORIZONTAL AIR PREHEATERS

BACKGROUND OF THE INVENTION

The present invention relates to the axial seals and radial seals of a rotary regenerative air preheater for controlling leakage within the air preheater. More particularly, the invention relates methods and apparatus for adding additional axial seals and radial seals within installed air preheaters.

A rotary regenerative air preheater transfers sensible heat from the flue gas leaving a boiler to the entering combustion air through regenerative heat transfer surface in a rotor which turns continuously through the gas and air streams. The rotor, which is packed with the heat transfer surface, is divided into compartments by a number of radially extending plates referred to as diaphragms. These compartments are adapted to hold modular baskets in which the heat transfer surface is contained.

The air preheater is divided into a flue gas side or sector and one or more combustion air sides or sectors by sector plates. In a typical installed rotary regenerative heat exchanger, rigid or flexible radial seals mounted on the axial edges of the diaphragms are in close proximity to these sector plates and minimize leakage of air and/or gas between sectors. Similarly, rigid or flexible axial seals mounted on the outboard edge of the diaphragms are in close proximity to axial seal plates mounted on the inner surface of the housing and minimize leakage therebetween. In typical installed air preheaters, the number of diaphragms and the width of the sector plates and the seal plates are such that only one radial seal and one axial seal is disposed proximate to the respective plate at any one time. These seals are proximity seals and are not designed to contact the sealing surface of the sector plates or seal plates. Consequently, there is leakage past the seals where the amount of leakage is dependent on the pressure differential between the air and gas streams across the seals. Leakage can degrade thermal performance, and require increased energy use resulting in higher costs for powering the fans. The leakage flow carries ash which produces erosion of the seals and sealing surfaces.

SUMMARY OF THE INVENTION

The present invention relates to a method for adding additional axial seals and radial seals within existing air preheaters. To retrofit the additional seals, the original heat transfer baskets, the original radial seals, the original axial seals, and the original gratings are all removed from the air preheater. If stay plates are installed, they are either removed or modified to accept an intermediate diaphragm plate. A diaphragm inner support plate is mounted within each of the original compartments. Hot and cold end plates are mounted to the post and to an inboard portion of the original diaphragm plates. At this point an intermediate diaphragm plate is positioned within each original compartment by mounting it to the inner support plate and the rotor shell. New gratings and/or stay plates are mounted to the original diaphragm plates and the intermediate diaphragm plate. Additional hot and cold end axial seal support bars are mounted to the rotor shell and intermediate diaphragm plate. Axial seals are installed on the original axial seal support bars and on the additional axial seal support bars and radial seals are installed on the axial edges of the original diaphragm plates and the intermediate diaphragm plates. Finally, new heat transfer baskets are inserted into each of the compartments formed by the original diaphragm plates, the intermediate diaphragm plates, and the rotor shell.

DESCRIPTION OF THE PREFERRED EMBODIMENT

Figure 1:
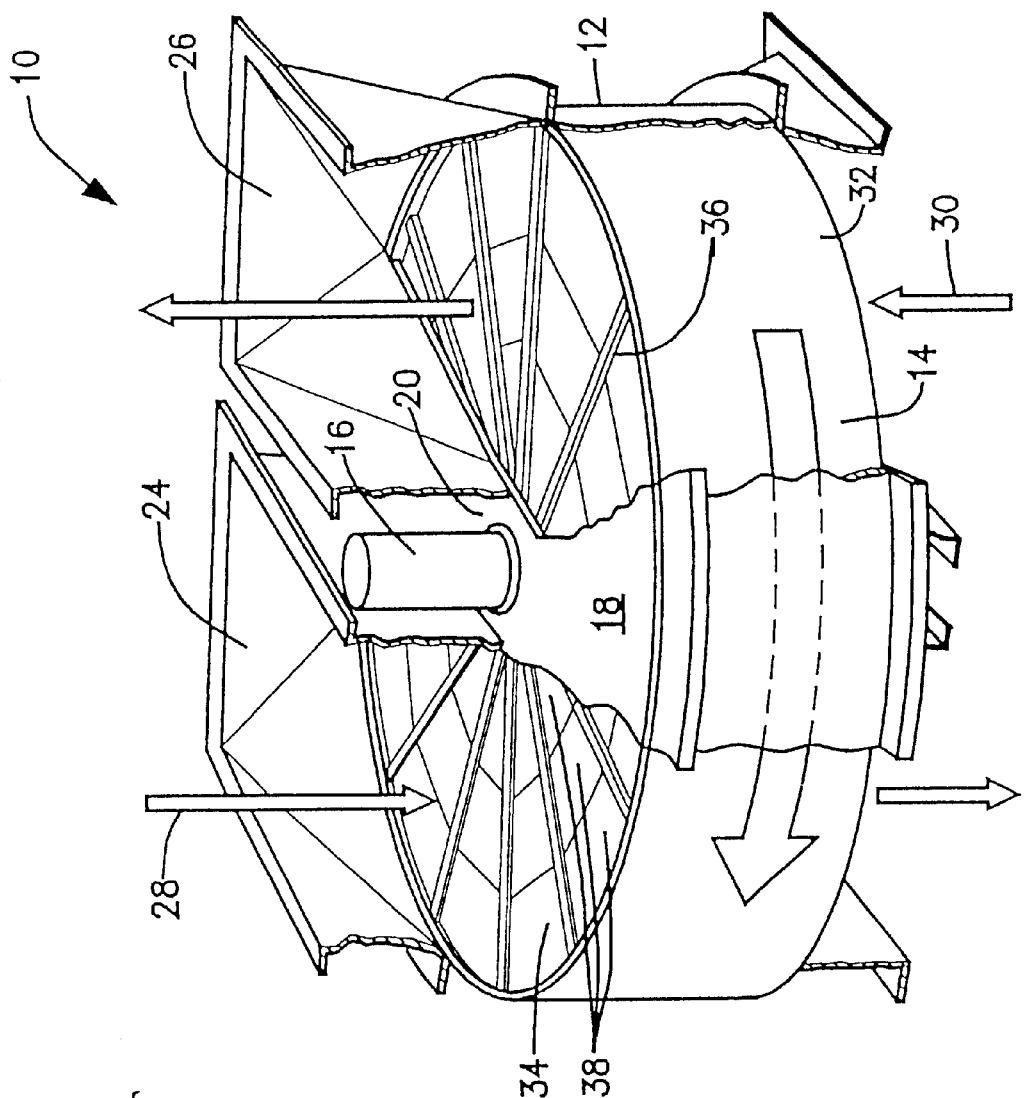
FIG. 1 is a general perspective view of a conventional bisector rotary regenerative air preheater which is cut-away to show the upper sector plates.
Figure 4:
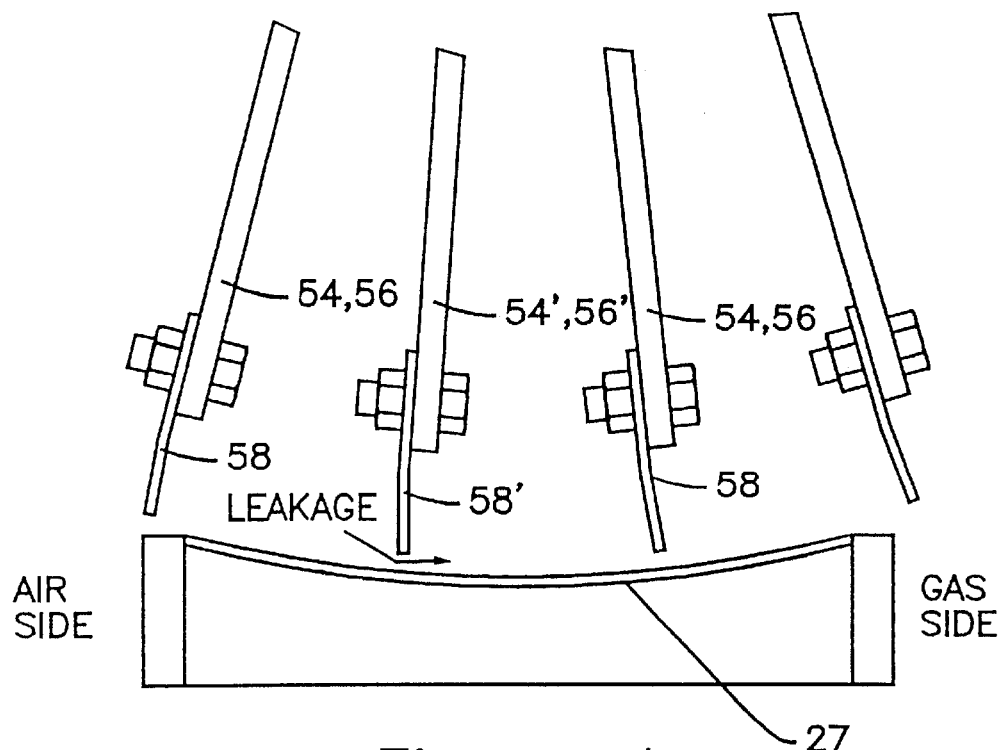
FIG. 4 is a cross section view of an axial seal plate and a portion of a rotor which has been modified in accordance with the present invention illustrating the double seal arrangement.

FIG. 1 of the drawings is a partially cut-away perspective view of a typical bi-sector horizontal air preheater 10 rotated 90 degrees showing a housing 12 in which the rotor 14 is mounted on a drive shaft or post 16. The housing is divided by means of the flow impervious sector plates 18 and 20 into a flue gas sector 24 and an air sector 26. Corresponding sector plates are also located on the bottom of the unit. Mounted on the inside of the housing 12 are axial seal plates 27 which extend the full height of the rotor (FIG. 4).

The hot flue gases enter the air preheater 10 as indicated by the arrow 28, flow through the flue gas sector 24 where heat is transferred to the heat transfer surface in the rotor 14. As this hot heat transfer surface then rotates through the air sector 26, the heat is transferred to the air flowing through the rotor as indicated by the arrow 30. Consequently, the cold air inlet and the cooled gas outlet define a cold end and the hot gas inlet and the heated air outlet define a hot end. The rotor 14 has a shell 32 and is divided into a plurality of pie-shaped compartments 34 by the diaphragm plates 36 with each compartment containing a plurality of heat exchange basket modules 38.

Figure 2:
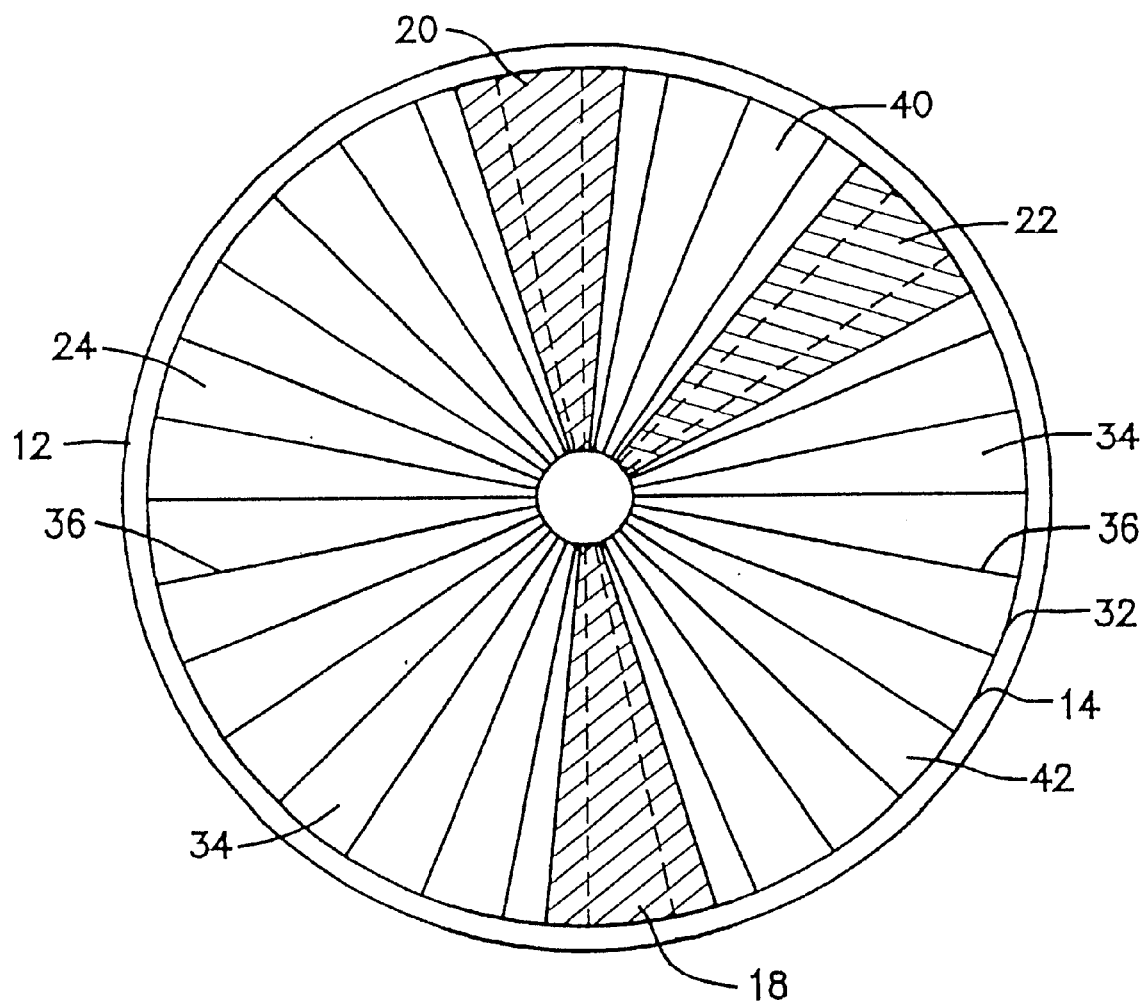
FIG. 2 is a simplified top view of a conventional trisector air preheater showing the rotor in the housing and showing the sector plates.
Figure 3:
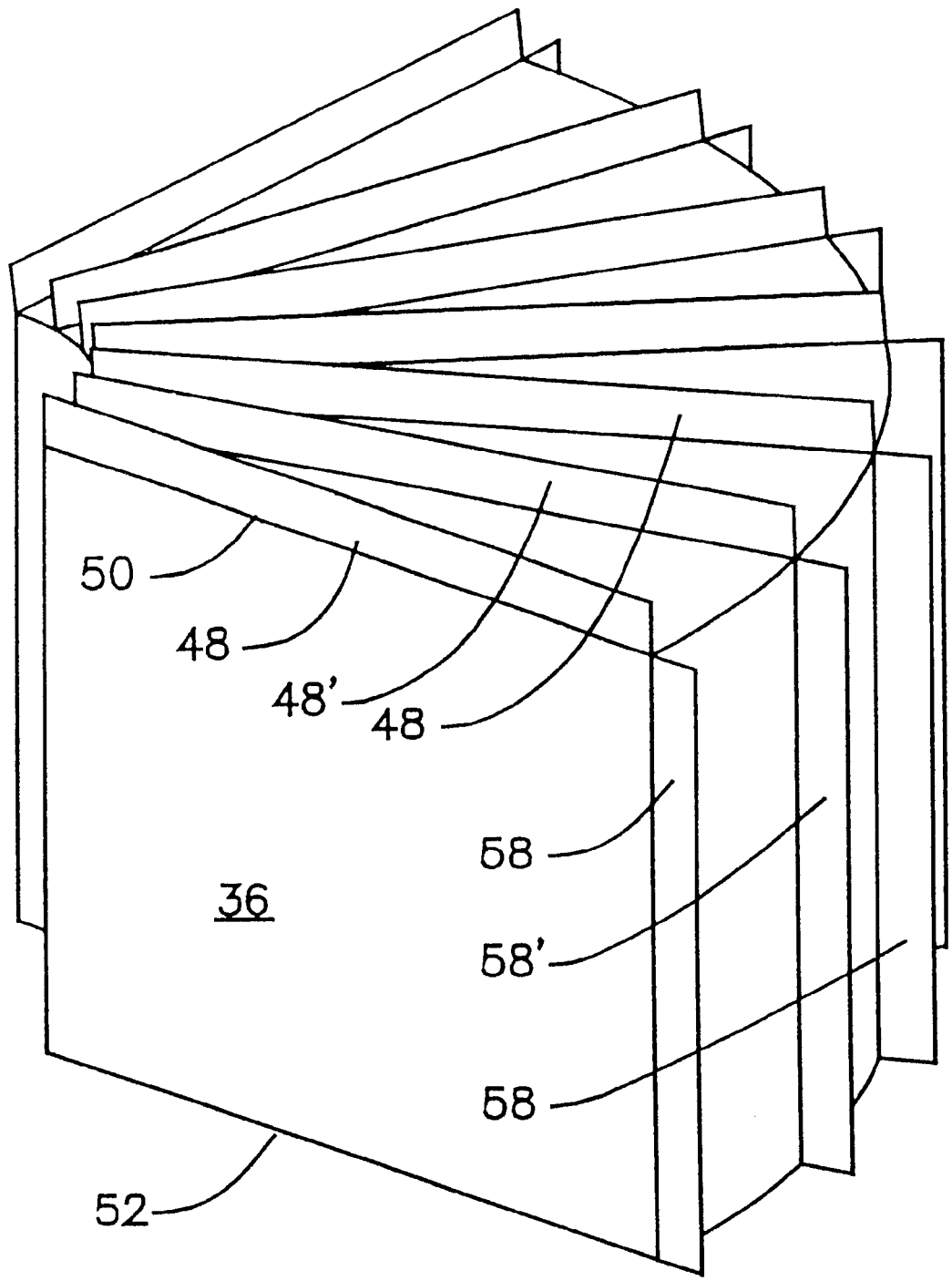
FIG. 3 is a simplified perspective view of a portion of the rotor assembly of an air preheater which has been modified in accordance with the present invention.
Figure 6:
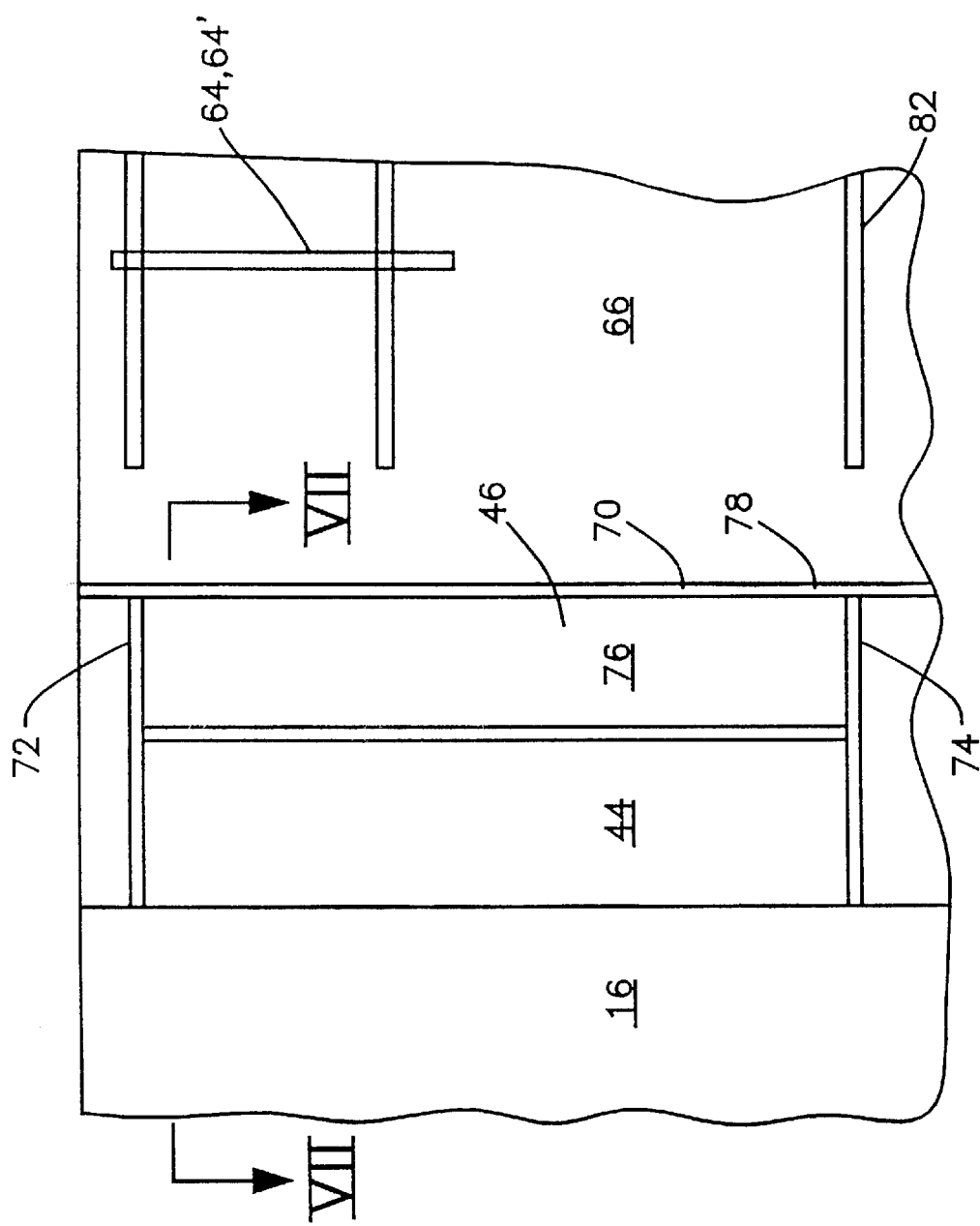
FIG. 6 is a side view of the inboard portion of the rotor of FIGS. 3 and 4 illustrating the post, a diaphragm plate, gratings, and stay plates.
Figure 7:
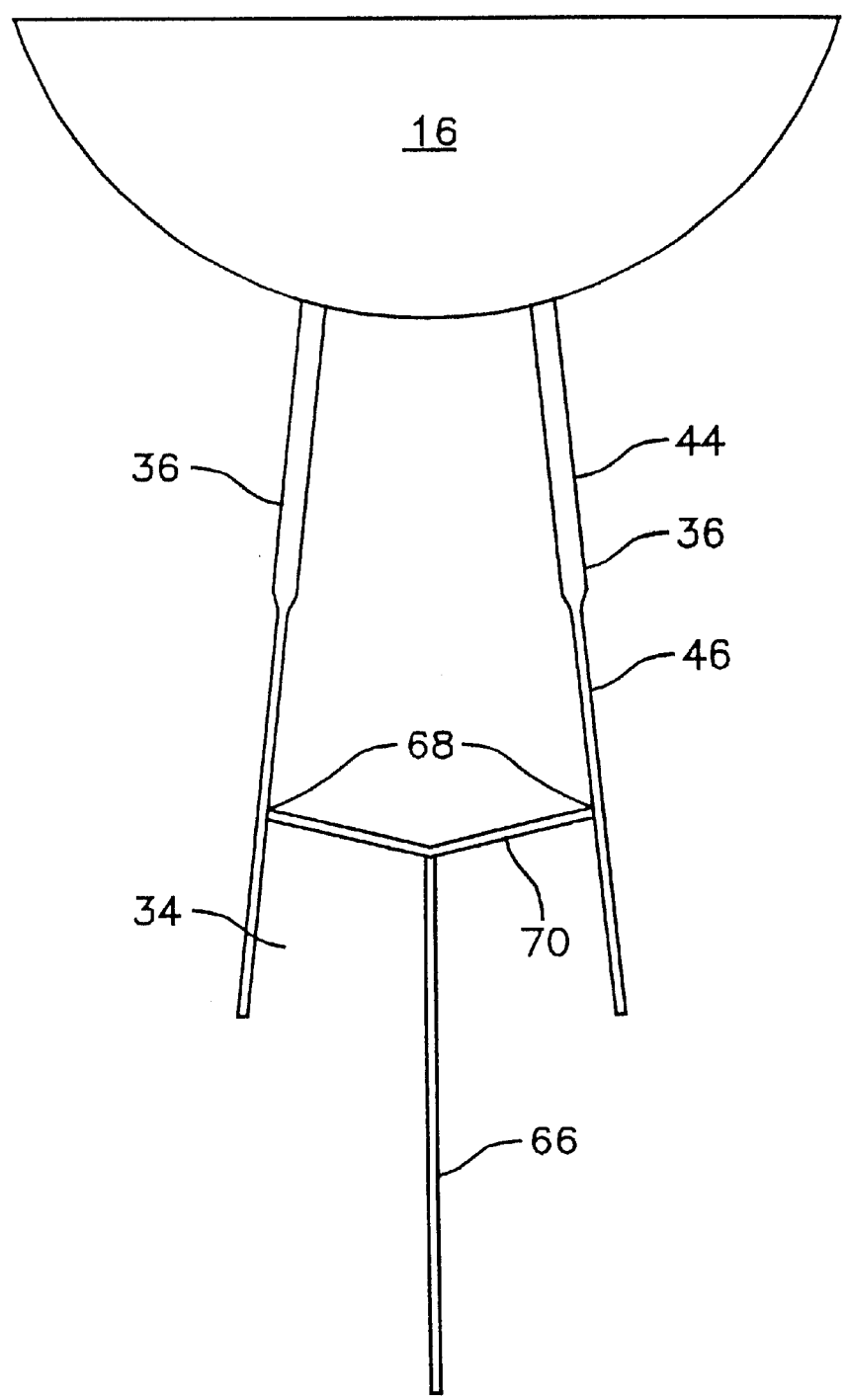
FIG. 7 is a cross section view, taken along line VII—VII of FIG. 6.
Figure 8:
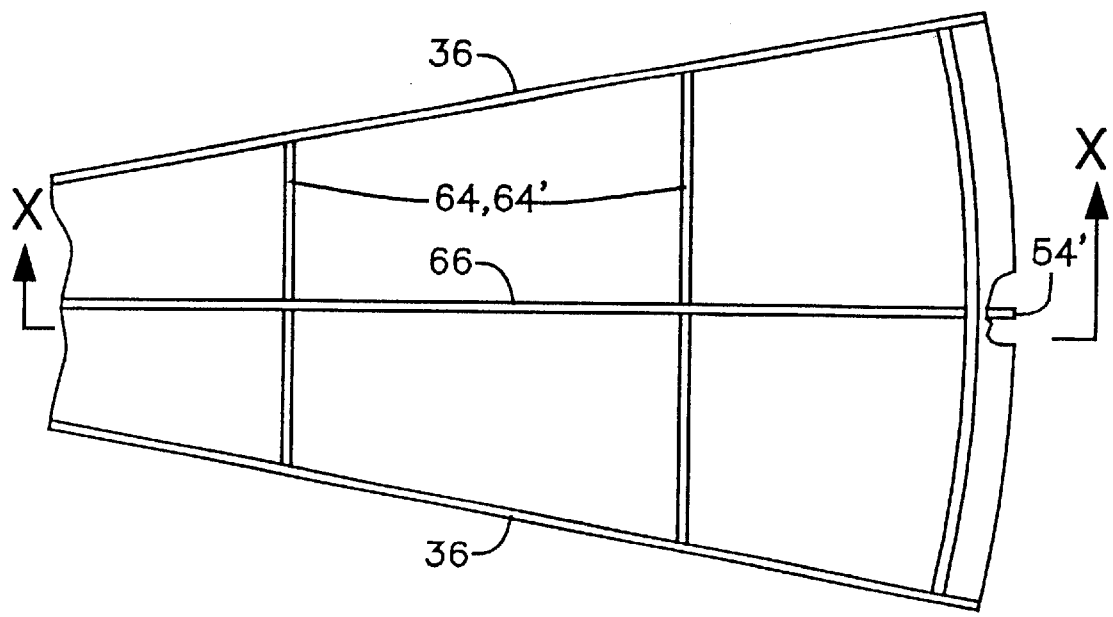
FIG. 8 is a top view of the outboard portion of the rotor of FIGS. 3 and 4, partly in phantom, illustrating a compartment after the addition of the intermediate diaphragm plate, stay plates, and additional axial seal support bar.

FIG. 2 is a plan view representation of a conventional trisector air preheater comprising the rotor housing 12 and the rotor 14. The housing is divided in this case into three sectors by the sector plates 18, 20 and 22. The sectors are the flue gas sector 24 and the air sector 26 which is divided into the primary air sector 40 and the secondary air sector 42. This figure illustrates the sector plates in cross-section for purposes of clarity. The rotor 14 is composed of the shell 32 and the diaphragm plates 36 dividing the rotor into compartments 34. Each diaphragm plate 36 is composed of a relatively thick stub diaphragm portion 44, which extends from and is mounted to the rotor post, and a relatively thin main diaphragm portion 46 (FIGS. 6 and 7).

Figure 10:
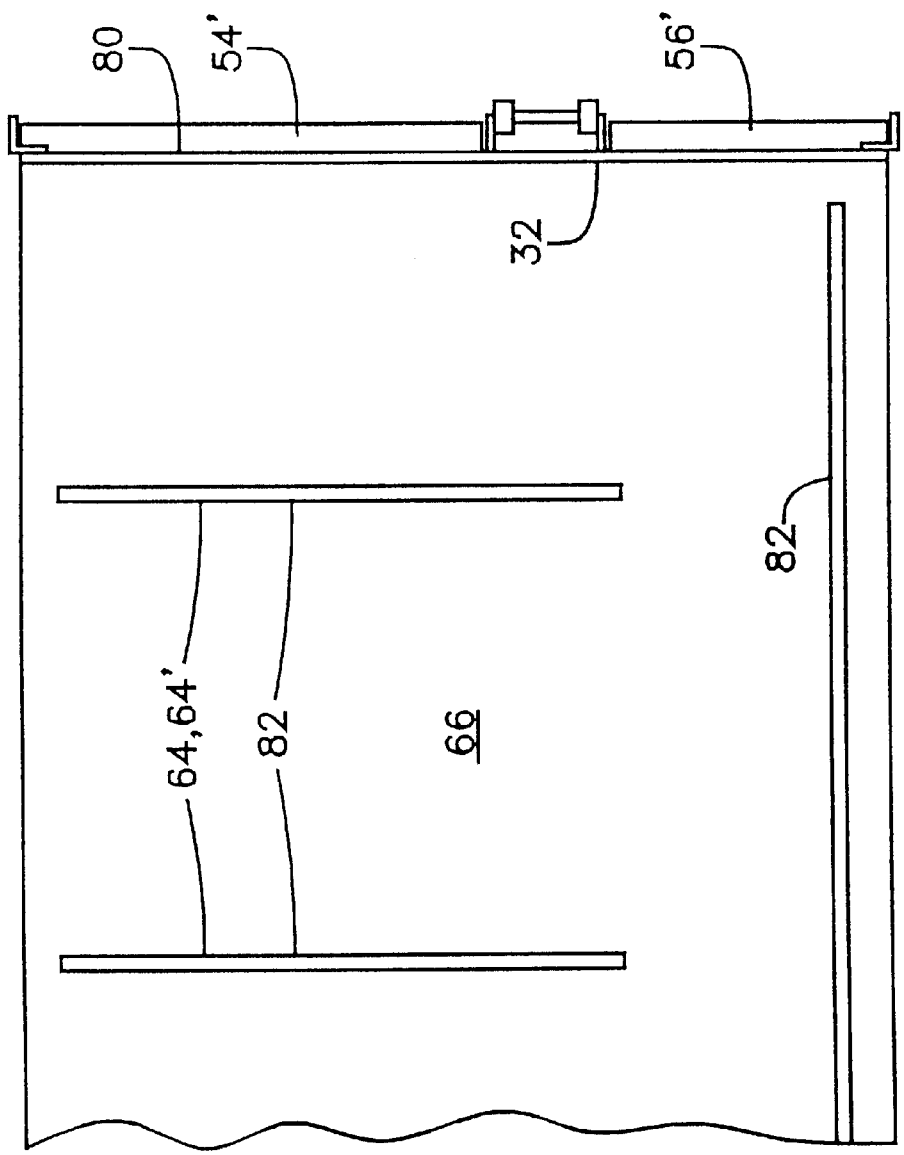
FIG. 10 is a cross section view, taken along line X—X of FIG. 8.
Figure 11:
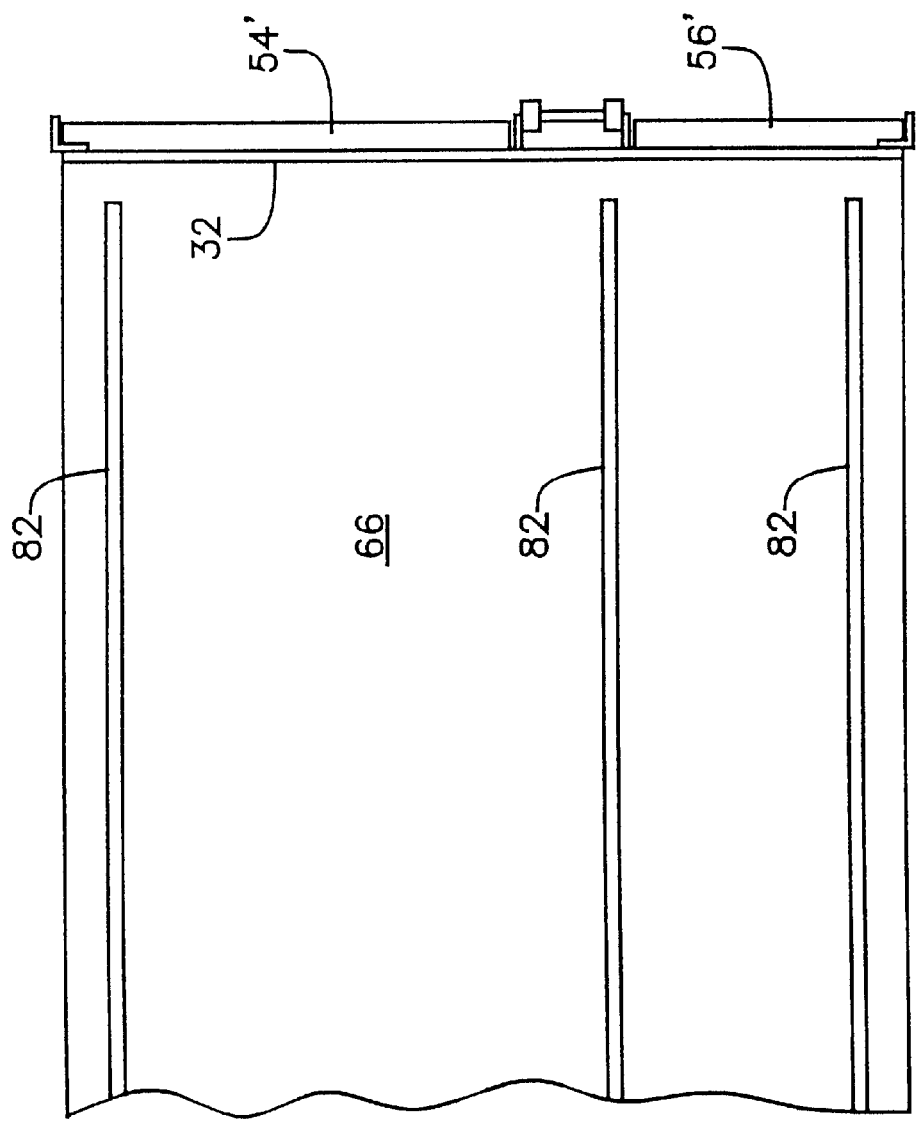
FIG. 11 is a cross section view of a second embodiment of the outboard portion of FIG. 8 illustrating an all grating construction.
Figure 12:
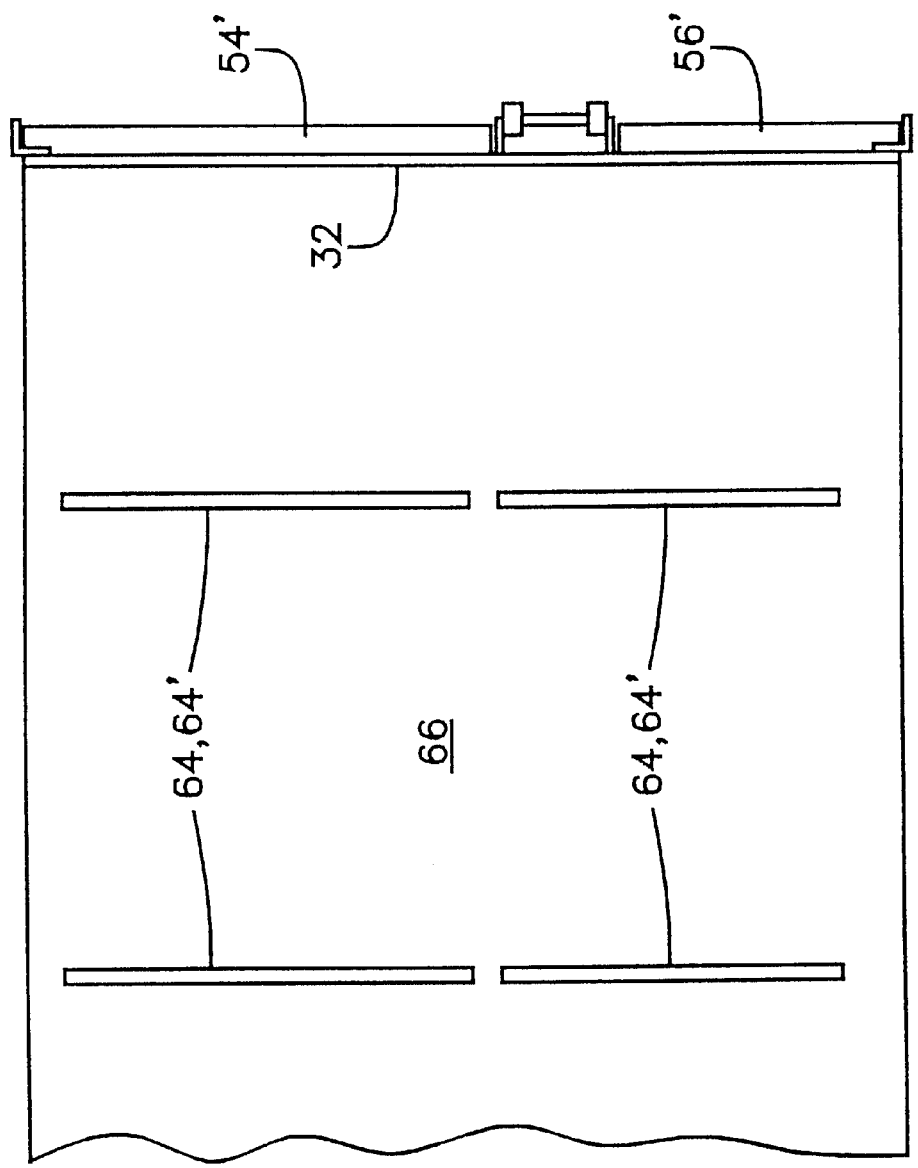
FIG. 12 is a cross section view of a third embodiment of the outboard portion of FIG. 8 illustrating an all stay plate construction.

The primary concern with the leakage is between the air and the flue gas sides 26, 24 of the air preheater 10. In a trisector air preheater, leakage between the primary and secondary air sectors 40, 42 is not as critical as leakage between the air sectors 26 and the flue gas sector 24. However, it is still desirable to keep this leakage to a minimum. In conventional air preheaters, radial seals 48 are attached to the axial edges 50, 52 of each diaphragm plates 36 and engage the sector plates 18, 20, 22 as the rotor 14 revolves to control leakage past the hot and cold ends of the diaphragm plates 36. Hot and cold end axial seal support bars 54, 56 are mounted on the rotor shell 32 in line and the outboard radial edge of each diaphragm plate (FIGS. 10, 11, 12). Axial seals 58 attached to the hot and cold end axial seal support bars 54, 56 engage the seal plates 27 as the rotor 14 revolves to control leakage past the outboard periphery of the rotor 14. The size of the sector plates 18, 20, 22 and seal plates 27 and the number of diaphragm plates 36 to which seals 48, 58 may be attached are limited in conventional air preheaters such that only one radial seal 48 and one axial seal 58 are positioned adjacent the respective plate at any one time. These seals 48, 58 are proximity seals and are not designed to contact the sealing surface of the sector plates 18, 20, 22 or seal plates 27. Consequently, there is leakage past the seals 48, 58 where the amount of leakage is dependent on the pressure differential between the air and gas streams across the seals 48, 58. The flow between the air and gas streams carries ash which produces erosion of the seals 48, 58 and sealing surfaces 18, 20, 22, 27, degrades thermal performance, and increases energy use of the fans.

Figure 5:
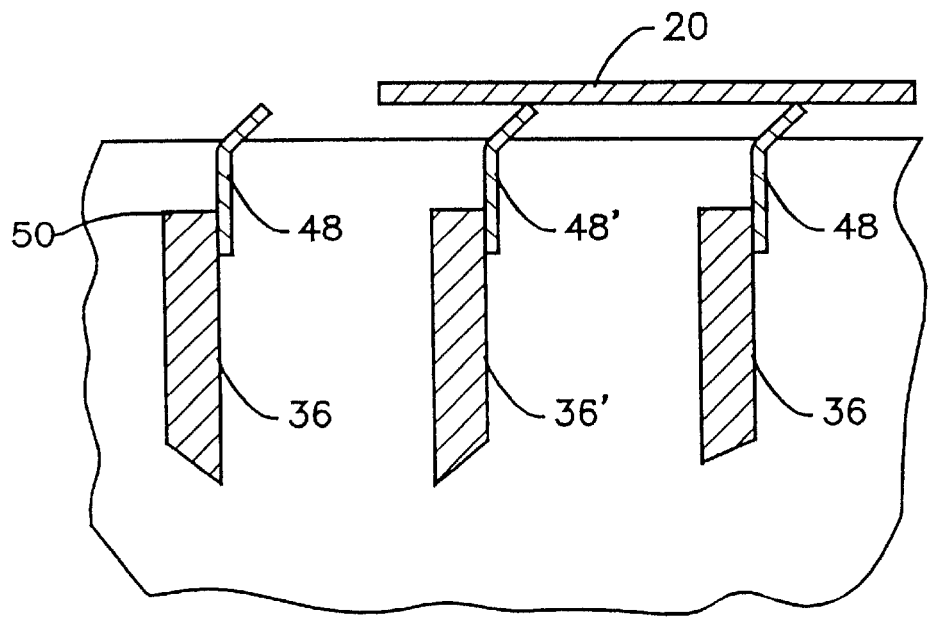
FIG. 5 is a cross section view of a sector plate and a portion of a rotor which has been modified in accordance with the present invention illustrating the double seal arrangement.

The rotor 14 of a conventional horizontal air preheater which has been modified in accordance with the subject invention has an additional radial seal 48' and an additional axial seal 58' mounted intermediate each pair of the original or existing diaphragm plates 36, such that two radial seals 48, 48' and two axial seals 58, 58' are in engagement with the sector plates 18, 20, 22 and seal plates 27, respectively, at the same time. This is illustrated in FIGS. 4 and 5. Since the pressure differential between the air and gas streams now drops across two sets of radial and axial seals 48, 48', 58, 58', the volume of leakage flow is reduced by approximately fifty percent (50%) compared to the leakage flow rate for a single set of radial and axial seals 48, 58. Since the leakage flow is reduced, the flow of ash carried in the leakage flow is reduced proportionally, reducing erosion, and thermal performance and energy use are improved.

Figure 9:
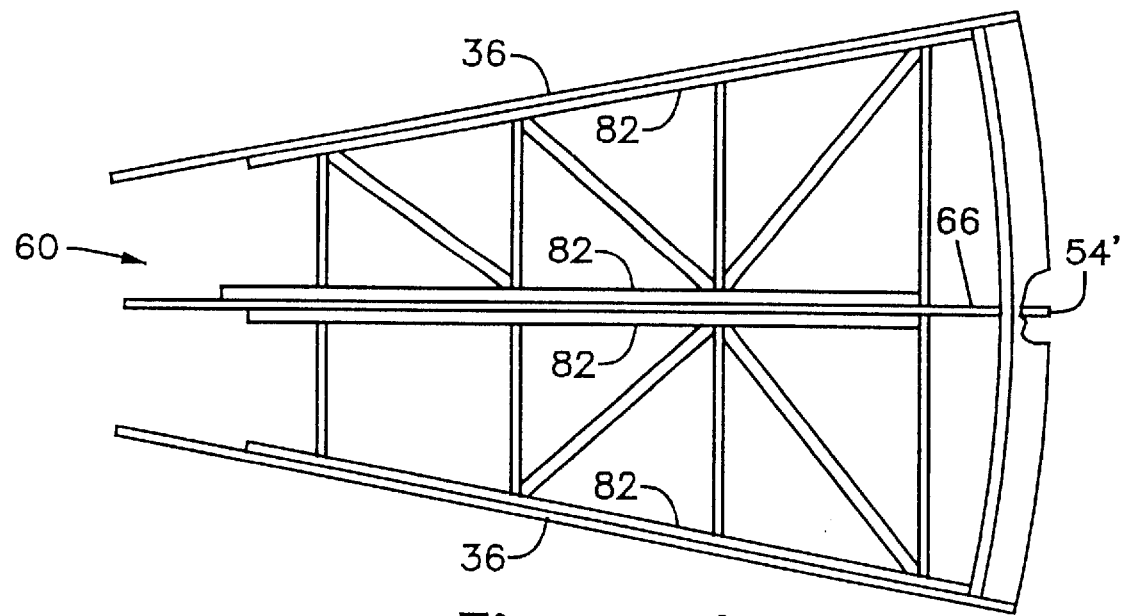
FIG. 9 is a top view of the outboard portion of FIG. 8, partly in phantom, illustrating the same compartment after the addition of gratings.

Conventional air preheaters do not have the structure required to support the additional radial and axial seals 48', 58' since these new seals are installed intermediate existing diaphragm plates 36. Therefore, an additional support structure 60 positioned intermediate the existing diaphragm plates 36 (FIG. 9) is required to provide mechanical support to the new seals 48', 58'. The nature of the additional support structure 60 is in part determined by the heat transfer basket/heat transfer basket support structure design which is incorporated in the preexisting air preheater. Conventional air preheats utilize three different heat transfer basket/heat transfer basket support structure designs. If the same type of heat transfer baskets are to be used in the air preheater after modification in accordance with the invention, the additional support structure 60 must include the same elements as the original existing support structure. Consequently, the subject invention includes three different additional support structures to accommodate these different conventional heat transfer basket/heat transfer basket support structure designs.

The most common conventional heat transfer basket/heat transfer basket support structure design provides almost full use of the available rotor space. In this design, two layers of baskets are commonly used, with the cold end layer composed of full sector baskets and the hot end layer composed of individual type baskets. The support structure for this design comprises a combination of stay plates and gratings. This heat transfer basket/heat transfer basket support structure design requires, for example, a 67 inch deep rotor for 54 inches of heat transfer baskets. The conventional heat transfer basket/heat transfer basket support structure design that makes it easiest to change the heat transfer baskets utilizes a support structure composed of all gratings and two layers of full sector heat transfer baskets. The drawback of this design is the amount of rotor depth that is required to accommodate it. For example 54 inches of heat transfer baskets would require an 86 inch deep rotor. This is due to the fact that the heat transfer baskets take up more space and there is an unused area behind the pin rack. The conventional heat transfer basket/heat transfer basket support structure design which requires the least rotor depth utilizes a support structure composed of all stay plates and two layers of individual heat transfer baskets. This design requires only a 62 inch deep rotor for 54 inches of heat transfer basket. However, this combination of baskets is the hardest to change.

To modify a conventional air preheater in accordance with the invention, the rotor assembly 14 is first emptied of all heat transfer baskets 38. Next, the original, existing radial seals 48, axial seals 58, and grating(s) are removed. For a conventional air preheater containing a combination of individual heat exchange baskets and full sector heat exchange baskets, or all individual heat exchange baskets, the original stay plates 64 may be re-used by forming a slot large enough to accommodate the thickness of the new intermediate diaphragm 66 plate in the middle portion of the stay plate 64 after any existing gratings are removed. If the original stay plates 64 are not going to be re-used they are removed at this time. For a conventional air preheater which contains or will contain all full sector heat exchange baskets, any original stay plates 64 or gratings should be removed.

The end portions 68 of a diaphragm inner support plate 70 are welded to the inner surface of each of the existing diaphragm plates 36 such that the inner support plate 70 extends across the original compartment 34 (FIG. 7). Hot and cold end plates 72, 74 are mounted over and below an inboard portion of each compartment, preferably by welding the end plates 72, 74 to the post 16, the stub diaphragm portion 44 and the inboard portion 76 of the main diaphragm portion 46. The intermediate diaphragm plate 66 is installed by welding the inboard end 78 to the inner support plate 70 and the outboard end 80 (FIG. 10) to the rotor shell 32.

For a conventional air preheater containing a combination of individual heat exchange baskets and full sector heat exchange baskets, the modified stay plates 64 and/or new stay plates 64' and new gratings 82 are welded to the original diaphragm plates 36 and the intermediate diaphragm plate 66. For a conventional air preheater containing all individual heat exchange baskets, the modified stay plates 64 and/or new stay plates 64' are welded to the original diaphragm plates 36 and the intermediate diaphragm plate 66. For a conventional air preheater containing all full sector heat exchange baskets, new gratings 82 are welded to the original diaphragm plates 36 and the intermediate diaphragm plate 66.

The additional hot and cold end axial seal support bars 54, 56 are welded to the rotor shell 32 and intermediate diaphragm plate 66, in line with the intermediate diaphragm plate 66. Once these modifications are complete on the entire rotor, axial seals 58, 58' are installed on the original axial seal support bars 54, 56 and on the additional axial seal support bars 54', 56' radial seals 48, 48' are installed on the axial edges of the original diaphragm plates 36 and the intermediate diaphragm plates 66, and new heat transfer baskets are installed. New heat transfer baskets are required since the intermediate diaphragm plate divides each of the original compartments into two compartment, each of which is substantially half the width of the original compartment.

What is claimed is:

1. An improvement for an existing horizontal air preheater having a rotor housing including a plurality of axial seal plates, sector plates on both axial ends of said air preheater dividing said air preheater into a flue gas sector and at least one air sector, and a rotor located in said rotor housing having an axial post, a plurality of original diaphragms extending radially from the post to a shell, the original diaphragms forming compartments in said rotor, a plurality of heat exchange baskets stored in said compartments, a plurality of gratings or stay plates mounted within said compartments for mounting said baskets, an original radial seal extending from each axial edge of each of said original diaphragms, and an original axial seal extending from an outboard radial edge of each of said original diaphragms, wherein the improvement comprises an intermediate diaphragm mounted between each of said original diaphragms, the intermediate diaphragms extending radially from the shell to a position intermediate the post and the shell, an additional axial seal extending an outboard radial edge of each of said intermediate diaphragms, and an additional radial seal extending from each axial edge of each of said intermediate diaphragms.

2. An air preheater as recited in claim 1, the rotor further having an original axial seal support bar mounted to said outboard radial edge of each of said original diaphragms, an original axial seal extending from each of said original support bars, said improvement further comprising an additional axial seal support bar mounted to said outboard radial edge of each of said intermediate diaphragms, an additional radial seal extending from each of said additional support bars.

3. An air preheater as recited in claim 1, the improvement further comprising additional gratings or stay plates.

4. A method for increasing the number of seals in a horizontal air preheater having first and second axial ends, a rotor housing, a plurality of sector plates disposed on said axial ends dividing said air preheater into a flue gas sector and at least one air sector, and a rotor disposed within said rotor housing, said rotor having a post, a rotor shell and a plurality of original diaphragms extending radially from the post to the rotor shell, said original diaphragms each having an outboard radial edge and first and second axial edges, said rotor shell and said original diaphragms defining a plurality of original compartments, said rotor further having a plurality of original heat exchange baskets stored in said original compartments, a plurality of original gratings and/or original stay plates mounted within said original compartments for mounting said original baskets, an original radial seal extending from each axial edge of each of said original diaphragms, an original axial seal support bar mounted to each of said outboard radial edges of said original diaphragms, and an original axial seal extending from each of said original support bars, the method including the steps of:

removing the original baskets from the original compartments;

removing the original radial seals and the original gratings;

modifying or removing the original stay plates;

mounting a diaphragm inner support plate within each original compartment;

mounting hot and cold end plates to the post and an inboard portion of the original diaphragm;

mounting an intermediate diaphragm to the inner support plate and the rotor shell;

mounting new gratings and/or stay plates to the intermediate diaphragms and original diaphragms;

mounting additional hot and cold end axial seal support bars to the rotor shell and intermediate diaphragm mounting axial seals on the original axial seal support bars and on the additional axial seal support bars;

mounting radial seals on the axial edges of the original diaphragms and the intermediate diaphragms; and installing new heat transfer baskets in each of the compartments formed by the original diaphragms, the intermediate diaphragms, and the rotor shell.

5. The method of claim 4 further comprising the step of modifying the original stay plates by forming a slot in the middle portion of the stay plate large enough to accommodate an intermediate diaphragm.

6. The method of claim 4 wherein the step of mounting a diaphragm inner support plate comprises the step of welding the end portions of the diaphragm inner support plate to the inner surface of each of the original diaphragms, wherein the inner support plate extends across the original compartment.

7. The method of claim 4 wherein each of the original diaphragms comprise a stub diaphragm and a main diaphragm and the inboard portion of each original diaphragm comprises the stub diaphragm and an inboard portion of the main diaphragm.

8. A method for increasing the number of seals in a horizontal air preheater having first and second axial ends, a rotor housing, a plurality of sector plates disposed on said axial ends, and a rotor disposed within said rotor housing, said rotor having a post, a rotor shell and a plurality of original diaphragms extending radially from the post to the rotor shell, said original diaphragms each having an outboard radial edge and first and second axial edges, said rotor shell and said original diaphragms defining a plurality of original compartments, said rotor further having a plurality of original heat exchange baskets stored in said original compartments, a plurality of original gratings and original stay plates mounted within said original compartments for mounting said original baskets, an original radial seal extending from each axial edge of each of said original diaphragms, an original axial seal support bar mounted to each of said outboard radial edges of said original diaphragms, and an original axial seal extending from each of said original support bars, the method including the steps of:

removing the original baskets from the original compartments;

removing the original radial seals and the original gratings;

modifying or removing the original stay plates;

mounting a diaphragm inner support plate within each original compartment;

mounting hot and cold end plates to the post and an inboard portion of the original diaphragm;

mounting an intermediate diaphragm to the inner support plate and the rotor shell;

mounting new gratings and stay plates to the intermediate diaphragms and original diaphragms;

mounting additional hot and cold end axial seal support bars to the rotor shell and intermediate diaphragm mounting axial seals on the original axial seal support bars and on the additional axial seal support bars;

mounting radial seals on the axial edges of the original diaphragms and the intermediate diaphragms; and installing new heat transfer baskets in each of the compartments formed by the original diaphragms, the intermediate diaphragms, and the rotor shell.

9. A method for increasing the number of seals in a horizontal air preheater having first and second axial ends, a rotor housing, a plurality of sector plates disposed on said axial ends, and a rotor disposed within said rotor housing, said rotor having a post, a rotor shell and a plurality of original diaphragms extending radially from the post to the rotor shell, said original diaphragms each having an outboard radial edge and first and second axial edges, said rotor shell and said original diaphragms defining a plurality of original compartments, said rotor further having a plurality of original heat exchange baskets stored in said original compartments, a plurality of original gratings and original stay plates mounted within said original compartments for mounting said original baskets, an original radial seal extending from each axial edge of each of said original diaphragms, an original axial seal support bar mounted to each of said outboard radial edges of said original diaphragms, and an original axial seal extending from each of said original support bars, the method including the steps of:

removing the original baskets from the original compartments;

removing the original radial seals and the original gratings;

removing the original stay plates if installed;

mounting a diaphragm inner support plate within each original compartment;

mounting hot and cold end plates to the post and an inboard portion of the original diaphragm;

mounting an intermediate diaphragm to the inner support plate and the rotor shell;

mounting new gratings to the intermediate diaphragms and original diaphragms;

mounting additional hot and cold end axial seal support bars to the rotor shell and intermediate diaphragm mounting axial seals on the original axial seal support bars and on the additional axial seal support bars;

mounting radial seals on the axial edges of the original diaphragms and the intermediate diaphragms; and installing new heat transfer baskets in each of the compartments formed by the original diaphragms, the intermediate diaphragms, and the rotor shell.

10. A method for increasing the number of seals in a horizontal air preheater having first and second axial ends, a rotor housing, a plurality of sector plates disposed on said axial ends, and a rotor disposed within said rotor housing, said rotor having a post, a rotor shell and a plurality of original diaphragms extending radially from the post to the rotor shell, said original diaphragms each having an outboard radial edge and first and second axial edges, said rotor shell and said original diaphragms defining a plurality of original compartments, said rotor further having a plurality of original heat exchange baskets stored in said original compartments, a plurality of original gratings and original stay plates mounted within said original compartments for mounting said original baskets, an original radial seal extending from each axial edge of each of said original diaphragms, an original axial seal support bar mounted to each of said outboard radial edges of said original diaphragms, and an original axial seal extending from each of said original support bars, the method including the steps of:

removing the original baskets from the original compartments;

removing the original radial seals and the original gratings;

modifying or removing the original stay plates;

mounting a diaphragm inner support plate within each original compartment;

mounting hot and cold end plates to the post and an inboard portion of the original diaphragm;

mounting an intermediate diaphragm to the inner support plate and the rotor shell;

mounting the modified of new stay plates to the intermediate diaphragms and original diaphragms;

mounting additional hot and cold end axial seal support bars to the rotor shell and intermediate diaphragm mounting axial seals on the original axial seal support bars and on the additional axial seal support bars;

mounting radial seals on the axial edges of the original diaphragms and the intermediate diaphragms; and installing new heat transfer baskets in each of the compartments formed by the original diaphragms, the intermediate diaphragms, and the rotor shell.

* * * * *